United States Patent [19]

Okamura

[11] 4,274,714
[45] Jun. 23, 1981

[54] REAR VIEWER FOR AUTOMOBILE

[76] Inventor: Makoto Okamura, No. 1567-4, Sakata, Okegawa City, Japan

[21] Appl. No.: 54,536

[22] Filed: Jul. 3, 1979

[30] Foreign Application Priority Data

Jul. 15, 1978 [JP] Japan .......................... 53/97419[U]

[51] Int. Cl.³ ................................................ G02B 3/08
[52] U.S. Cl. ...................................... 350/452; 350/445
[58] Field of Search ............... 350/211, 286, 287, 302, 350/307, 202

[56] References Cited

U.S. PATENT DOCUMENTS 3,809,461  5/1974  Baumgardner et al. ......... 350/211 X
3,809,462  5/1974  Baumgardner ................ 350/211 X Primary Examiner—Paul A. Sacher
Attorney, Agent, or Firm—Ladas & Parry

[57] ABSTRACT

A rear viewer for automobile is disclosed having means for mounting an optical system on an automobile rear window glass, which means consists of a box member made of synthetic resin or light metal and holds the optical system made of synthetic resin and composed of optical elements selected from a group of one or more Fresnel concave lenses of plate shape, plate-like prisms, with or without a plate-like mirror. Light beams from an optical field at the immediate outside of an automobile rear end portion are converged and refracted so as to enable an automobile driver to see the conditions of the aforesaid optical field, whereby the safety in automobile driving is improved. An auxiliary optical means consisting of a combination of the aforesaid plate-shaped optical elements and mounted at the rear end portion of the automobile may be used in conjunction with the optical system of the box member, for further improving the driver's view of the aforesaid optical field.

3 Claims, 10 Drawing Figures

FIG._4A
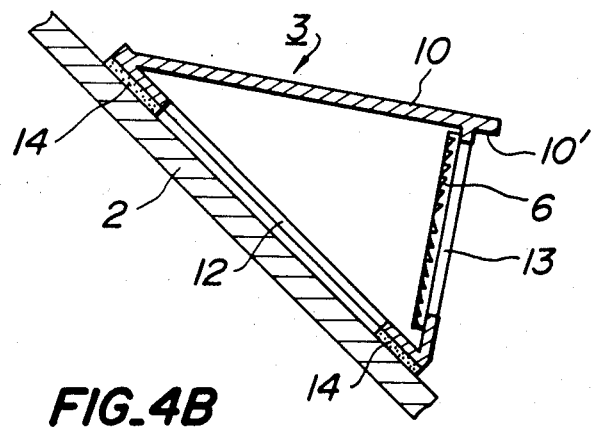
FIG._4B
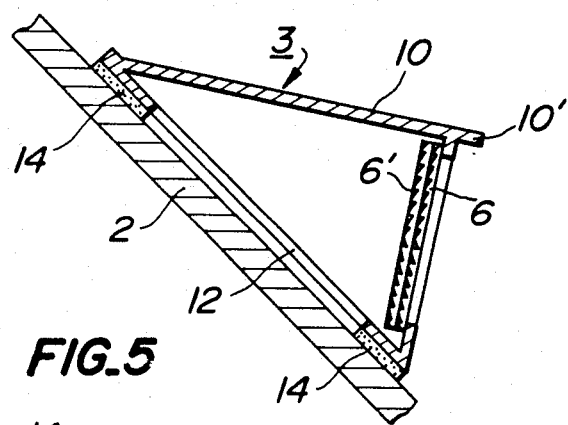
FIG._5
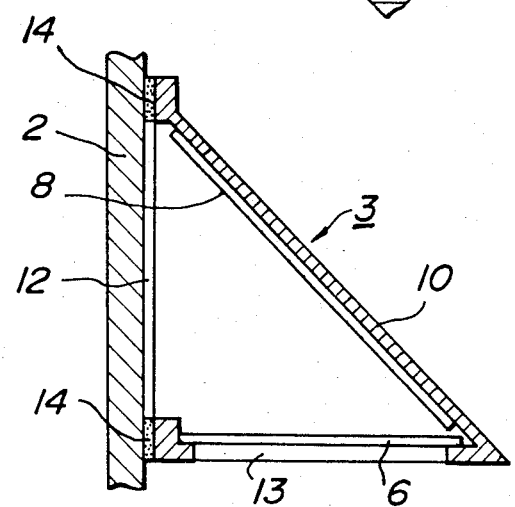

REAR VIEWER FOR AUTOMOBILE

This invention relates to a rear viewer for enabling an automobile driver to see the conditions at immediate below outside of the rear end portion of an automobile, and more particularly to a rear viewer of the aforesaid type which comprises an optical system having at least one of Fresnel concave lens means, and prism means, with or without mirror means for enabling the automobile driver to see, directly or indirectly through a front room mirror, the conditions at immediate below outside of the rear end portion of the automobile.

There is a conventional rear viewer for projecting the sight around the rear end portion of an automobile onto a front room mirror located before a driver's seat, which rear viewer comprises optical elements made of glass, such as glass lenses, glass prisms with glass mirrors. Such conventional rear viewer has shortcomings in being easily susceptible to breakage of glass parts, being heavy due to the use of the glass elements, and being costly due to the use of optical glasses. Most of the conventional rear viewers require holes bored on an automobile body for mounting, which holes may cause a mechanical weakness in the automobile body. In view of those drawbacks, the conventional rear viewer has not been used widely.

On the other hand, from the standpoint of safety, there is a strong need for a device which enables an automobile driver to watch the conditions around the immediate below vicinity of the automobile rear end.

Therefore, an object of the present invention is to obviate the aforesaid difficulties or drawbacks of the conventional rear viewers and to meet the need for safety, by providing an improved rear viewer for automobile which uses optical elements made of synthetic resin with a much lighter specific weight than optical glass. The rear viewer according to the present invention also uses a box member adapted for easily mounting to automobile without necessitating any holes on the automobile body. With the present invention, optical elements, such as lenses, and prisms are formed in plate shapes by using synthetic resin, so as to facilitate mounting of the optical elements onto the box member, which box member is so formed as to be easily mounted directly onto a rear window glass of an automobile.

In the present invention, if the shape of an automobile requires, an auxiliary optical means may be used together with the optical system built in the box member. The auxiliary optical means may be mounted in the rear end portion of the automobile body and consists of one or more thin plate-shaped optical elements capable of refracting or converging light beams from the immediate below outside of the automobile rear end for directing the light beams toward the optical system of the box member.

The rear viewer according to the present invention is of simple construction with light weight, so that the rear viewer is highly resistant to breakage and free from troubles. Furthermore, the rear viewer of the present invention can be produced at a low cost and can be mounted on automobile bodies firmly without requiring any holes in the automobile body. The synthetic resin optical elements to be used in the present invention are free from adverse effects of weather changes, for instance, free from mist formation on lens surfaces.

Other objects and advantages of the present invention may be appreciated by referring to the following description and claims, taken in conjunction with the accompanying drawings, in which:

FIGS. 4A, 4B, 5 and 6 are schematic sectional views, each view illustrating an example of the optical arrangement in a box member for holding optical elements to be used in the present invention;

Like parts are designated by like numerals throughout the description.

Figure 1:
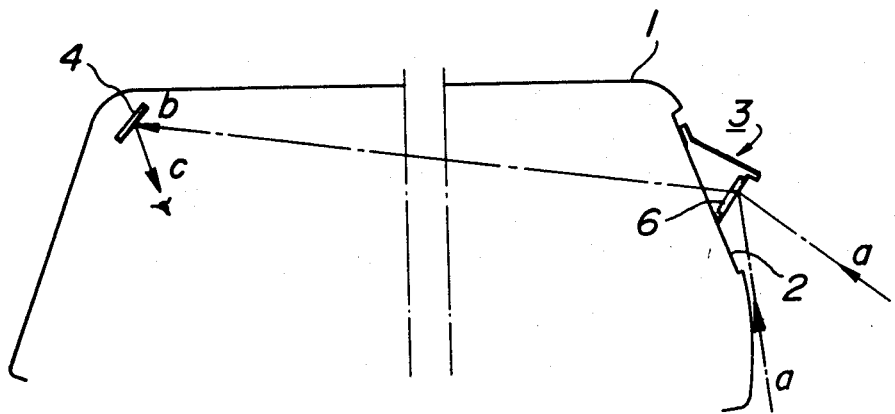
FIG. 1 is a schematic sectional view showing a rear viewer according to the present invention, as mounted on rear window glass of an automobile.
Figure 2:
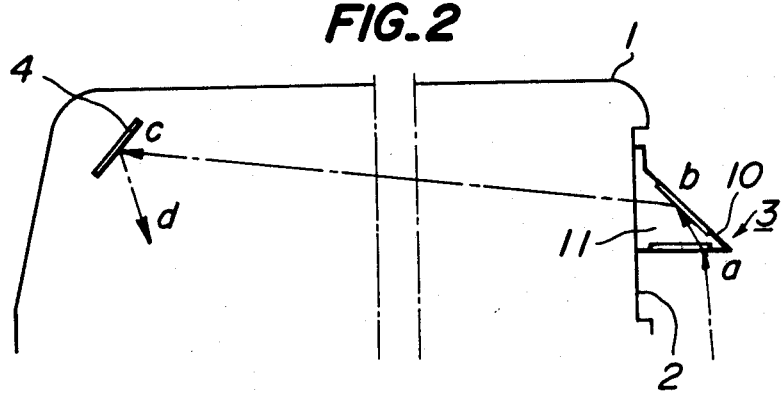
FIG. 2 is a view similar to that of FIG. 1, illustrating another embodiment of the present invention.
Figure 3:
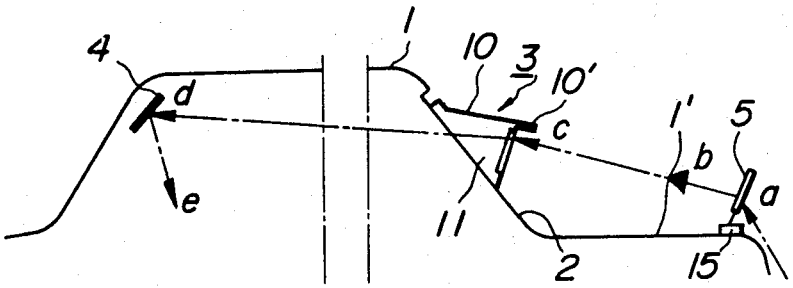
FIG. 3 is a schematic sectional view showing a rear viewer with an auxiliary optical means according to the present invention, as mounted on an automobile body.

FIGS. 1 and 2 illustrate rear viewers of the present invention as mounted on an automobile having a rear window glass disposed substantially vertically, such as a bus or a station wagon, while FIG. 3 shows a rear viewer as mounted on an automobile having an inclined rear window glass. In the figures, 1 is an automobile body, 2 is a rear window glass, 3 is a box member for holding optical elements, 4 is a front mirror located before a driver seat, and 5 is an auxiliary optical means.

FIGS. 4A, 4B, and 5 show different constructions of the box member 3 and different manners in which various optical elements are mounted thereon.

Referring to FIGS. 4A, the optical system of the rear viewer comprises a Fresnel concave lens 6 of thin plate shape, which is made of synthetic resin and mounted on the rear side of the box member relative to the forward direction of the automobile. In the example of FIG. 4B, the optical system includes two Fresnel concave lenses 6, 6' overlaid one on the other. The box member 3 is bonded to the outer surface of the automobile rear window glass 2 by a bonding portion 14, which bonding portion may be formed by a suitable adhesive for bonding the box member made of synthetic resin or light metal to the rear window glass.

Referring to FIG. 1, the light beams from the optical field at the immediate below outside of the automobile rear end portion are converged by the Fresnel concave lens 6, as shown by the arrows a, a, and b. The converged light beams are reflected from the front mirror 4 so as to reach the eyes of the driver, as shown by the arrows b and c.

It is noted here that the Fresnel concave lens 6 can be replaced with a suitable prism, as the prism refracts the light beams from the immediate below outside of the automobile rear end toward the front room mirror 4, as shown by the arrow b of the figure.

Referring to FIGS. 2 and 5, depending on the construction of the automobile body, the optical system of the rear viewer of the present invention may include a plate-like reflective mirror 8 made of synthetic resin for directing the light beams from the Fresnel concave lens 6 toward the front room mirror 4. In this case, the optical path from the optical field at the immediate below outside of the automobile rear end to the driver's eyes becomes as shown by the arrows a, b, c, and d of FIG. 2.

Figure 7:
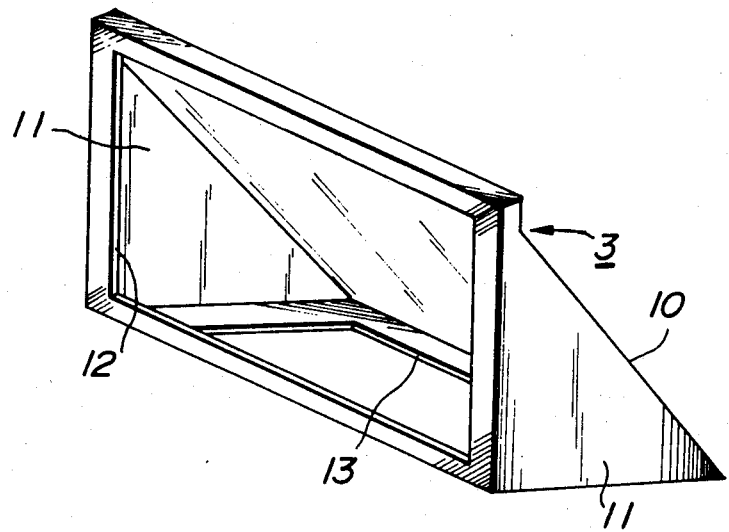
FIG. 7 is a perspective view of a box member to be used in the present invention.

FIG. 7 shows the details of the box member 3. The box member 3 has a substantially triangular cross section perpendicular to the longitudinal direction thereof as shown in FIG. 5, and has a inclined roof wall 10 extending along the top side of the said substantially rectangular cross section and integrally formed with side walls 11, 11. A first or forward opening 12 extends along one side of said substantially triangular cross section, e.g., along the side facing the automobile rear window glass 2, while a second or backward opening 13 extends along the remaining side of said substantially rectangular cross section. The box member 3 is attached to the automobile rear window glass 2 by the bonding portion 14 so as to keep the first opening 12 in parallel with the glass 2. The Fresnel concave lens 6 is mounted on the box member 3 so as to cover the entire span of the second opening 13. In the example of FIG. 5, the plate-like mirror 8 made of synthetic resin is attached to the inside surface (lower surface as seen in FIG. 5) of the roof wall 10. After being bonded to the automobile rear window glass 2, the box member 3 is kept substantially airtight and watertight by the roof wall 10, the bonding portion 14, the side walls 11, 11, and the Fresnel lens 6. Accordingly, the function of the optical elements of the rear viewer of the present invention is not affected by weather conditions, such as rain, snow, frost and the like.

Figure 6:
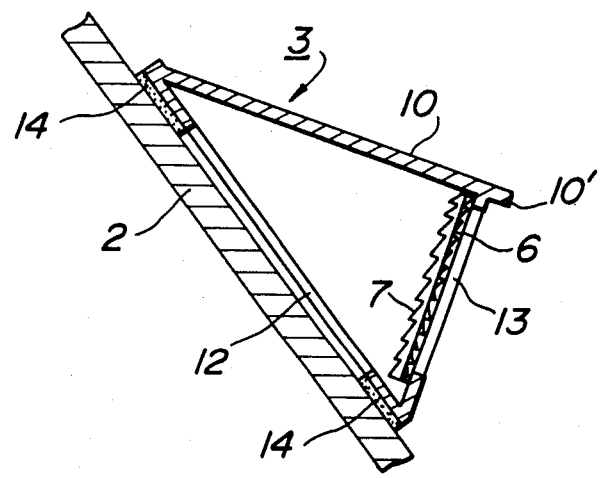
Figure 8:
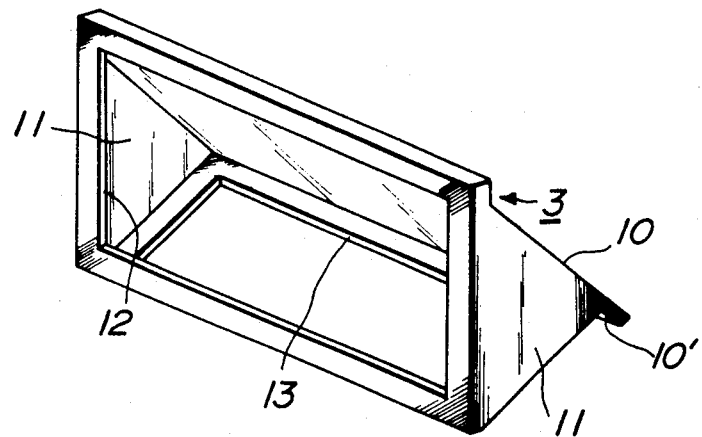
FIG. 8 is a perspective view of a modified form of the box member.

In the example of FIG. 3, the automobile rear window glass 2 has the upper end thereof inclined toward the forward direction of the automobile and the rear end portion of the automobile body extends considerably rearwardly away from the glass 2, so that the optical system in the box member 3 is slightly modified as shown in FIG. 6 and an auxiliary optical means 5 is used together with the optical system of the box member 3. Referring to FIG. 6, the construction of the box member 3 to be used in the example of FIG. 3 is similar to that of FIGS. 4A, 4B, and 6. The plate-like prism 7 of the illustrated example has a saw-teeth shaped cross section for facilitating the refraction of light beams. Referring to FIGS. 6 and 8, the roof wall 10 has an extended eaves or edge 10' for protection of the optical element at the second opening 13. In the illustrated embodiment of FIG. 6, the number of the Fresnel concave lenses in the box member 3 is not restricted to one, but two or more Fresnel concave lenses may be overlaid one over the other in the box member 3, if so desired.

Figure 9:
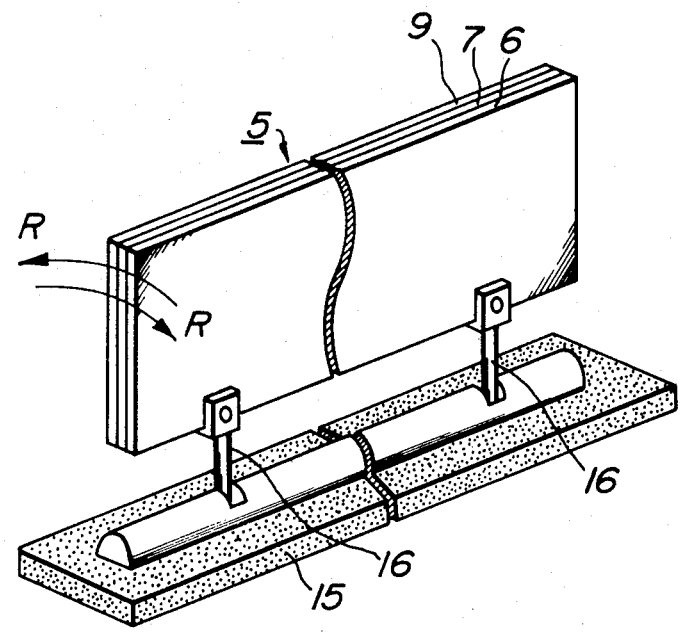
FIG. 9 is a perspective view of an auxiliary optical means to be used in the optical system of FIG. 3.

FIG. 9 shows the construction of the auxiliary optical means 5, wherein 6 is a Fresnel concave lens of plate shape made of synthetic resin, 7 is a plate-like prism made of synthetic resin, and 9 is a transparent reinforcing plate made of synthetic resin. The plate-shaped elements 6, 7, and 9 are overlaid one on the other and integrally bonded by adhering the fringe portion thereof, while disposing the plate-like prism 7 at the center with the Fresnel concave lens 6 at the outer side which is the rear side relative to the forward direction of the automobile and the transparent reinforcing plate 9 at the inner side (the front side relative to the forward direction of the automobile). The composite plate member thus formed is supported on a seat 15 by arms 16, 16, so as to be swingable in the directions of the arrows, R, R. The auxiliary optical means 5 can be mounted on a suitable portion of the automobile body 1 by the seat 15. Preferably, the seat 15 is made of a rubber block with fine magnetic powders mixed therein, so as to facilitate magnetic attachment of the auxiliary optical means 5 onto the automobile body 1, without necessitating any holes through the body 1. For instance, the auxiliary optical means 5 can be mounted at the back of a trunk room of the automobile body 1 in a detachable manner so as to face the automobile rear window glass 2.

In the illustrated example of the auxiliary optical means 5, a combination of the Fresnel concave lens of plate shape 6 and the plate-like prism 7 is used, but the object of the present invention can be fulfilled by either one of the Fresnel concave lens of plate shape 6 and the plate-like refractive prism 7.

The light beams from the optical field at the immediate belows outside of the automobile rear end are converged by the auxiliary optical means 5, as shown by the arrows a and b of FIG. 3, and reach the optical system of the box member 3 mounted on the rear window glass 2 of automobile, and then proceed to the driver's eyes after being converged and refracted again in the box member 3, as shown by the arrows c, d, and e.

The different embodiments of the present invention as described above can be selectively applied to various automobiles, depending on the shapes of the specific automobile bodies and the window glasses.

In any of the aforesaid embodiments of the present invention, the automobile driver can see the conditions at the immediate outside of the automobile rear end through the front room mirror 4, but it is also possible to arrange the optical system so that the automobile driver can directly see the optical field of the rear viewer without using the front room mirror.

Furthermore, each of the aforesaid box members 3 can be made of soft synthetic resin, so that the box member fits well to the curved surface of the rear window glass 2 of automobile. To facilitate the mounting of the box member 3 to the rear window glass 2, a double-sided adhesive tape may be applied to the outside periphery of the first opening 12 of the box member 3.

As described in the foregoing, with the rear viewer according to the present invention, various optical elements, such as a Fresnel concave lens, a prism, and a reflective mirror, are formed by synthetic resin in thin plate-like shapes, and such optical elements are selectively mounted on a box member adapted for direct mounting on the rear window glasses of automobile having different constructions. If necessary, an auxiliary optical means formed by a suitable combination of the aforesaid plate-like optical elements can be mounted on the rear portion of the automobile body, for use together with the optical system of the box member 3 for ensuring good view of the optical field at the immediate below outside of the automobile rear end. The rear viewer according to the present invention is of simple construction, facilitating low cost production and minimizing troubles, and the rear viewer can be mounted on an automobile without requiring any holes on the automobile body. Besides, the optical system of the rear viewer of the present invention is not affected by various weather conditions for ensuring reliable operations under any weather conditions. Thus, the present invention contributes greatly to the industry.

Although the present invention has been described with a certain degree of particularly, it is understood that the present disclosure has been made only by way of example and that numerous changes in the details of construction and the combination and arrangement of parts may be resorted to without departing from the spirit and the scope of the invention as hereinafter claimed.

What is claimed is:

1. An arrangement for enabling the driver of an automobile having a rear window to see in a rear view mirror the area adjacent and below the rear end of the automobile, comprising an elongated box member of substantially triangular cross section perpendicular to the longitudinal axis of said box member, and having a roof wall on the upper side thereof extending along one side of said triangular cross section, a first opening extending along another side of said substantially triangular cross section and a second opening extending along the remaining side of said substantially triangular cross section, and including Fresnel light refracting optical means formed from synthetic resin and located in said second opening, bonding means being provided around the edges of said first opening for bonding said box member to the outside surface of said rear window, in such manner that said optical means is directed towards said area adjacent and below the rear end of the automobile, whereby light from said area is refracted by said optical means to the rear view mirror.

2. An arrangement according to claim 1, including a mirror on the inside of said roof wall to assist in directing light refracted by the optical means to the rear view mirror.

3. An arrangement according to claim 1, for an automobile having a rear end portion extending backwardly from the rear window, including a second Fresnel light refracting optical means adapted for mounting on the outside extremity of said rear end portion in such manner that said second optical means is directed towards said area adjacent and below the rear end of the automobile, whereby light from said area is refracted by said second optical means to the optical means located in the second opening of said elongated box member and hence to the rear view mirror.

* * * * *